United States Patent Office 2,785,073
Patented Mar. 12, 1957

2,785,073

VINEGAR PRODUCT AND PROCESS OF MANUFACTURE

Carl A. Rietz, San Francisco, Calif., assignor to Rietz Manufacturing Company, Santa Rosa, Calif., a corporation of California No Drawing. Application March 8, 1955, Serial No. 493,059

3 Claims. (Cl. 99—147)

This invention relates generally to edible table vinegar such as is widely sold for domestic use and for the food processing industry.

Edible table vinegar such as is sold commercially has an acetic content which may vary from 5 to 9%. One problem in the marketing of vinegar is that organic solids present in colloidal solution tend to precipitate, thus causing objectionable cloudiness and the appearance of settled solids in the bottom of the container. In general this causes deterioration during storage and tends to detract from attractiveness and salability. The reason for this gradual precipitation is not clearly understood, but is probably the result of complex chemical changes which gradually take place during storage at normal temperature.

It is an object of the present invention to provide a new table vinegar product which is stabilized in such a manner as to prevent or greatly inhibit the objectionable precipitation referred to above.

Another object of the invention is to provide a table vinegar product which has new and valuable properties when used for various purposes, such as to prepare salad oils, pickling brines, or the like.

Another object of the invention is to provide a new vinegar product of the above character having added spice or condiment solids, and which is stabilized with respect to maintenance of such solids in suspension.

Another object of the invention is to provide a new method for the manufacture of my vinegar.

Additional objects and features of the invention will appear from the following description in which the preferred embodiments have been set forth in detail.

In accordance with the present invention, I take a good quality table vinegar, such as one made from wine, and I add an edible organic jell forming material capable of stabilizing the wine to inhibit objectionable precipitation of solids. One jell forming material which has been found particularly effective is animal gelatin. The amount of gelatin added to obtain a reasonable degree of stabilization may range from about 0.5 to 1%.

A suitable procedure is as follows: The animal gelatin, in dry powdered form, is added directly to a quantity of the vinegar. The vinegar is then vigorously agitated, as by means of a Waring Blendor, until the gelatin has completely dispersed. The gelatin goes into colloidal solution with the vinegar, without causing any appreciable change in color or flavor characteristics.

The procedure applied above can be used as a final operation in the manufactured vinegar, immediately prior to introducing the vinegar into containers for storage or marketing.

My product possesses a number of desirable features. As previously stated, it is stabilized with respect to precipitation which tends to occur in ordinary table vinegar. Thus it is not subject to the development of cloudiness or accumulation of precipitated solids in the bottom of a container in which the vinegar is stored or marketed. Another charactertistic is that it provides a superior material for compounding with oil and other ingredients, for the preparation of such products as salad dressings and the like, particularly in that it lends stability to an emulsion of vinegar and oil. It also provides a medium in which finely divided condiment solids can be maintained in stable suspension. Thus finely ground herbs or like condiments can be added to the vinegar at the time the gelatin is added, and placed in stable suspension. This provides a stable spiced or seasoned vinegar. My stabilized vinegar can also be used for the manufacture of a stable brine for pickling cucumbers, onions, and like products. In such event salt is dissolved in the vinegar to provide a brine of the desired concentration, and in addition finely divided condiments or seasoning ingredients can be added, such as dill, or the like, and maintained in suspension.

In the foregoing description I have referred particularly to vinegar made from wine. It will be evident that the invention can be applied to other forms of edible table wine, such as vinegar made from cider, malt or beer.

I claim:

1. As a new vinegar product, edible table vinegar containing from 0.5 to 1% of animal gelatin dispersed therein as a colloidal solution, the product being stabilized with respect to precipitation and settlement of solids.

2. A method for the manufacture of a stable edible table vinegar comprising dispersing therein from 0.5 to 1% of animal gelatin, the gelatin being dispersed in colloidal solution, 3. As a new vinegar product, edible table vinegar containing finely divided condiment solids in suspension and stabilized with respect to precipitation and settlement of solids by the presence of from 0.5 to 1% of dispersed animal gelatin.

References Cited in the file of this patent

UNITED STATES PATENTS 2,043,713   Saywell _____ June 9, 1936

OTHER REFERENCES

"Clarification of Vinegar," Industrial and Engineering Chemistry, vol. 26, April 1934, pages 379-385.